United States Patent
Moyal et al.

[19]

[11] Patent Number: 6,075,856
[45] Date of Patent: Jun. 13, 2000

[54] SUBSCRIBER CIRCUIT

[75] Inventors: Michael Moyal, Munich, Germany;
Herbert Zojer, Villach, Austria;
Bernhard Zojer, Villach, Austria;
Franz Dielacher, Villach, Austria;
Ulrich Riedle, Feldkirchen-Westerham, Germany

[73] Assignee: Siemens Aktiengesellschaft, Munich, Germany

[21] Appl. No.: 08/927,501

[22] Filed: Sep. 10, 1997

[30] Foreign Application Priority Data

Sep. 11, 1996 [DE] Germany ............................ 196 36 954

[51] Int. Cl.⁷ .................................................. H04M 19/00
[52] U.S. Cl. ............................ 379/399; 379/398; 379/413
[58] Field of Search ...................... 379/399, 398, 379/413, 412, 405, 394, 400

[56] References Cited

U.S. PATENT DOCUMENTS

| | | | |
|---|---|---|---|
| 4,588,858 | 5/1986 | Watts et al. | 379/405 |
| 4,588,860 | 5/1986 | Ayano et al. | 379/413 |
| 4,600,811 | 7/1986 | Hayashi et al. | 379/405 |
| 4,622,442 | 11/1986 | Martin | 379/348 |
| 4,703,499 | 10/1987 | Fossas | 379/387 |
| 4,837,818 | 6/1989 | Pieters et al. | 379/405 |
| 4,866,767 | 9/1989 | Tamimoto et al. | 379/399 |
| 5,003,588 | 3/1991 | Wingerath | 379/412 |
| 5,323,460 | 6/1994 | Warner et al. | 379/413 |
| 5,343,514 | 8/1994 | Snyder | 379/93.01 |

FOREIGN PATENT DOCUMENTS

| | | |
|---|---|---|
| 0 102 111 A2 | 3/1984 | European Pat. Off. . |
| 34 36 284 C2 | 4/1986 | Germany . |
| 35 34 861 C2 | 4/1987 | Germany . |
| 39 16 707 A1 | 1/1990 | Germany . |
| 40 14 267 A1 | 11/1991 | Germany . |
| 40 23 138 A1 | 1/1992 | Germany . |

*Primary Examiner*—Forester W. Isen
*Assistant Examiner*—Jacques Saint-Surin
*Attorney, Agent, or Firm*—Hill & Simpson

[57] ABSTRACT

A subscriber circuit has several SLIC circuits (2, 3, 4, 5) combined in one multiple SLIC. The high-energy components of each SLIC circuit (2, 3, 4, 5) are realized as individual components (30, 31, 36, 37) in standard form. In order to remove non-linearities, the individual components (30, 31, 36, 37) are fed back via the respectively allocated SLIC circuit.

12 Claims, 3 Drawing Sheets

SUBSCRIBER CIRCUIT

BACKGROUND OF THE INVENTION

The present invention relates to a subscriber circuit in which several SLIC circuits are combined in one multiple SLIC. A SLIC is a supply circuit for an analog telephone, which circuit feeds a terminal apparatus and switches a call on and off. SLIC is the abbreviation for "Subscriber Line Interface Circuit."

In existing subscriber circuits, a SLIC is respectively allocated to a subscriber in an exchange, and is connected with this subscriber via an a-lead (tip) and a b-lead (ring). A subscriber circuit in the exchange contains several SLICs, as well as a battery and a call signal generator common to the SLICs. Using the call signal generator, each SLIC supplies a call alternating signal for the subscriber allocated to it, via the a-lead or, respectively, the b-lead.

Thus, up to now a SLIC has been allocated to each subscriber, containing all the necessary high-energy and low-energy components for its functioning, i.e. the supplying of the call alternating signal. The high-energy components are, in particular, relays that switch on and off the call alternating signals on the a-lead or b-lead.

The allocation of a SLIC to each subscriber entails a considerable expense, which results in a relatively high space requirement due to the relays. This expense and this space requirement could be considerably reduced if the supporting of several subscribers could be assigned to one "multiple" SLIC, so that such a multiple SLIC supplies call alternating signals to several subscribers, for example four subscribers.

SUMMARY OF THE INVENTION

It is an object of the present invention to provide a subscriber circuit in which the expense for SLIC circuits is reduced, in that one multiple SLIC is allocatable to several subscribers.

In general terms the present invention is a subscriber circuit in which several SLIC circuits are combined in one multiple SLIC. The high-energy components of each SLIC circuit are realized as individual components. The SLIC circuits are integrated in the multiple SLIC. The individual components are fed back via the respectively allocated SLIC circuit.

Advantageous developments of the present invention are as follows.

The individual components have an optical switch operatively connected to a transistor via a diode. The transistor is a SIPMOS transistor or is a power transistor.

The feeding back of the individual components ensues via an alternating current path and a direct current path.

For a reversal of polarity, the individual components are arranged in a bridge circuit in doubled and cross-coupled fashion.

In the present invention, the previous SLIC is divided into its low-energy components and its high-energy components. The low-energy components of several SLICs are combined to form a module, known as a "multiple" SLIC. The high-energy components are realized separately and externally for each individual SLIC. It is thereby important that standard high-voltage components, such as SIPMOS transistors, power transistors or MOS transistors, are used for these high-energy components.

In this division of the components into high-energy components and low-energy components, using standard components for the high-energy components, it would be disadvantageous if the high-energy components, which are constructed as individual elements, do not have a linear performance characteristic. A nonlinear performance characteristic causes noise during the transmission of speech signals. In order to remove this non-linearity, in the inventive subscriber circuit, the individual components that form the high-energy components are fed back via the respectively allocated SLIC. The desired linearity is achieved by means of this feeding back.

The individual components advantageously have a switch and a transistor which are operationally connected by a diode. In the inventive subscriber circuit, the relays of the existing SLIC are thus replaced by switches and transistors with diodes. The switches are preferably optical switches.

If the subscriber circuit is to be connected in such a way that a reversal of polarity of the signals respectively present on the a-lead or the b-lead is possible, the individual components are doubled in a bridge circuit and are arranged in cross-coupled fashion.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

DESCRIPTION OF THE PREFERRED EMBODIMENTS

Figure 1:
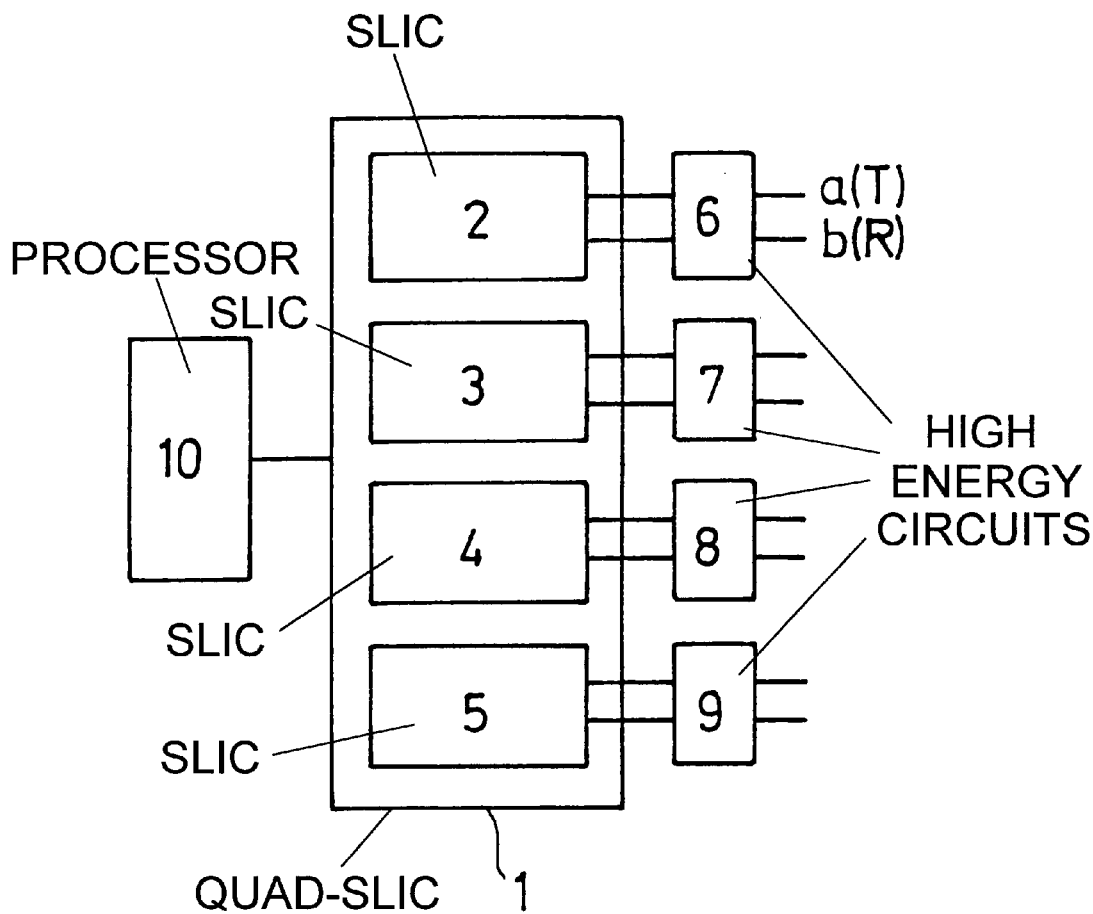
FIG. 1 is a block diagram of the present inventive subscriber circuit with four SLICs, i.e. what is known as a quad-SLIC.

FIG. 1 depicts a quad-SLIC 1, with four SLICs 2, 3, 4 and 5, to which a high-energy circuit part 6, 7, 8, 9 is respectively post-connected. Leads a (or T=tip) and b (or R=ring) respectively run from these high-energy circuit parts 6, 7, 8, 9 to the individual subscribers. The quad-SLIC 1 is controlled by a common digital signal processor 10.

It is first of all important to the present invention that the high-energy circuit parts 6, 7, 8, 9 are not contained in the individual SLICs, but rather are arranged separately therefrom. However, it is possible to integrate the four SLICs 2, 3, 4, 5 in one "quad-SLIC" 1.

For the high-energy circuit parts 6, 7, 8, 9, individual components such as optical switches and standard transistors are used, whereby a feeding back via the respectively allocated SLIC is carried out for the linearization of the standard transistors.

By means of the integration in a quad-SLIC, from which four channels run for the four subscribers, and the common controlling by means of the one digital signal processor 10, a reduction of the required physical space can be achieved, which is further amplified in that the surface requirement for the optical switches and the standard transistors is smaller than that for the previously provided relays.

Figure 2:
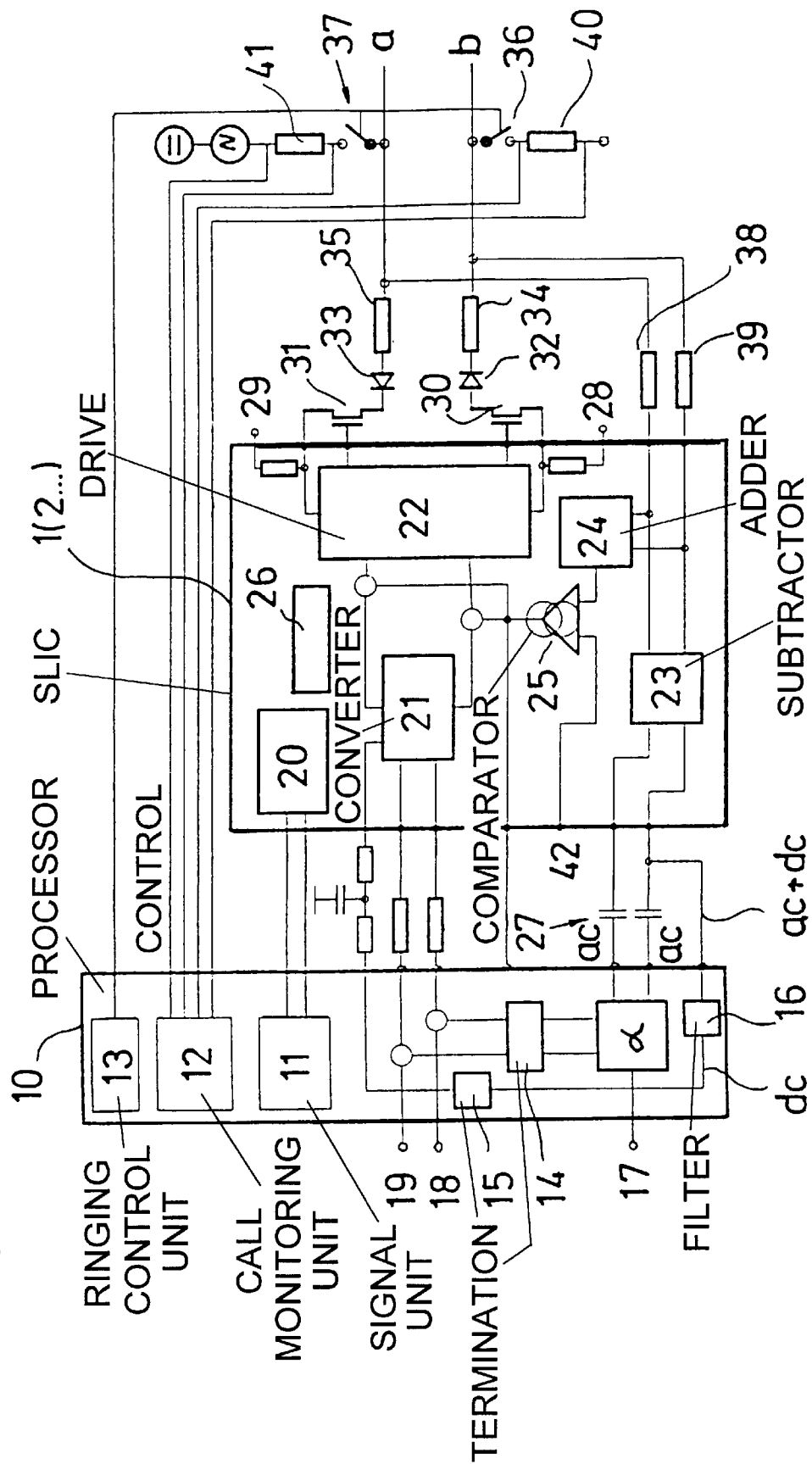
FIG. 2 is a schematic diagram of the present inventive subscriber circuit.

FIG. 2 shows a schematic diagram of the present inventive subscriber circuit. The digital signal processor 10 contains, in particular, a signal unit 11 that informs a subscriber of events on the line (a, b), a call monitoring unit 12 and a ringing control unit 13, which ensures that the telephone apparatus at a subscriber no longer rings when the subscriber has picked up the handset. In addition, units 14 and 15 are provided for the alternating voltage termination or, respectively, for the direct current feed characteristic. A low-pass filter 16 filters out the direct current portions dc from the alternating current and direct current portions ac+dc. Lines 17, 18 and 19 lead to the exchange.

In addition, FIG. 2 shows the quad-SLIC 1, whereby for the simplification of the graphic representation only one SLIC (thus, for example, SLIC 2) is shown in FIG. 2. This SLIC 2 is in fact integrated with the additional SLICs 3, 4 and 5 to form the quad-SLIC 1.

In the quad-SLIC 1, a control unit 20 is connected with the signal unit 11. The units 14 and 15 of the digital signal processor are connected via resistors to a 1:1 converter 21, to which a control unit drive 22 is subsequently connected. The quad=SLIC 1 also has, a unit 23, which subtracts the voltages VT and VR from one another and divides the result by a factor a, a unit 24, which adds the supplied to voltages VT and VR and divides the sum by 2, a comparator 25 and a reference supply 26. The unit 23 supplies the alternating current and direct current components ac+dc to the low-pass filter 16 and, via capacitors 27, supplies alternating current components ac to the α element. A direct current battery lies between terminals 28 and 29, which battery emits a voltage of e.g. −48 V. The terminal 28 is connected to ground.

Power transistors, such as for example SIPMOS transistors 30, 31 are connected in front of the control unit 22. The transistors are connected with diodes 32, 33, which are connected to the leads a or, respectively, b via safety resistors 34, 35. These leads a or, respectively, b are connected with the call monitoring unit 12 or with the ringing control unit 13 via optical switches 36, 37.

Thus, in the inventive subscriber circuit the high-energy components, i.e. the SIPMOS transistors 30, 31 and the switches 36, 37, are removed from the quad-SLIC 1 and are arranged separately. Standard components are used for these components 30, 31, 36, 37. Thus, the functions of the previously used relays are taken over by the SIPMOS transistors 30, 31 and the optical switches 36, 37. The optical switches 36, 37 thereby serve for switching on, while the SIPMOS transistors 30, 31 take over the switch-off functions of the relays.

The leads a and b are moreover connected with the unit 23 or, respectively, the unit 24 via protective resistors 38, 39. In addition, resistors 40, 41 lie between the switches 36, 37 and the call monitoring unit 12.

The standard components used for the SIPMOS transistors 30, 31 have non-linear characteristics. However, such non-linearity is undesired, and causes noise in the transmitted speech signals. In order to overcome these disadvantages of non-linearity, in the inventive subscriber circuit there ensues a feeding back of the direct current components dc and of the alternating current components ac to the control unit 22, via the unit 23, the α element (ac) or, respectively, the unit 15 (dc), and the converter 21. In addition, in the comparator 25, the control quantity supplied to a terminal 42, e.g. half the battery voltage, is compared with the voltage supplied by the unit 24, and the result is supplied to the control unit 22. Dependent on the signals fed to it, this control unit controls the gates of the SIPMOS transistors 30, 31 such that these operate in linear fashion.

Figure 3:
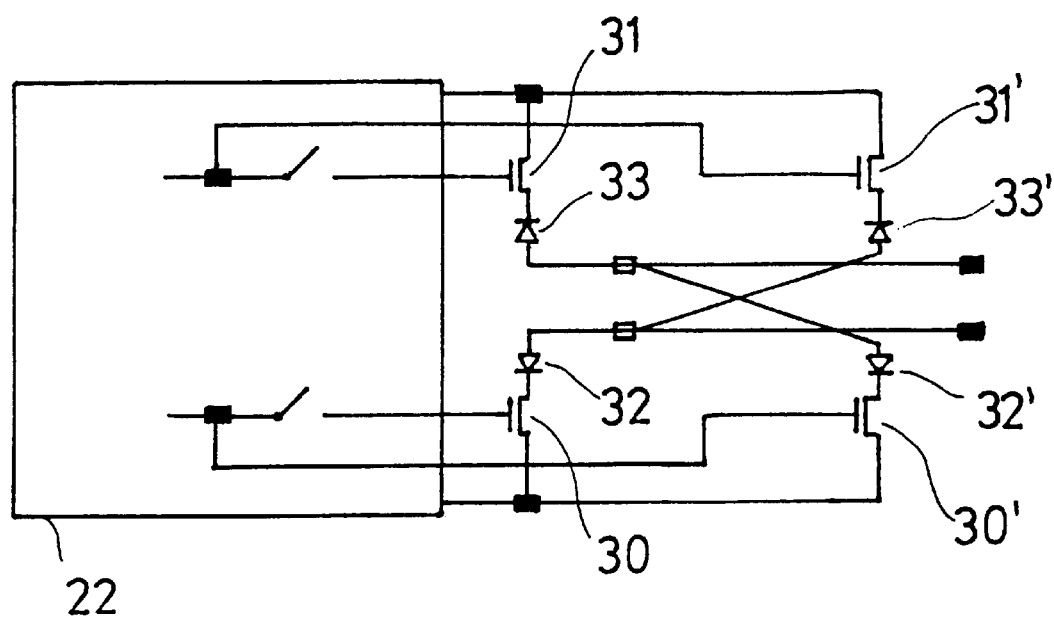
FIG. 3 depicts a circuit arrangement for reversal of polarity.

FIG. 3 shows a circuit arrangement for the polarity reversal of leads a and b. In FIG. 3, the same reference characters are used as in FIG. 2, while the components provided in doubled form for the bridge circuit in cross-coupling are provided with a stroke. In the switch shown in FIG. 3, all are in fact integrated into the control unit 22.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A subscriber circuit having subscriber line interface circuits (SLIC), comprising:

a plurality of SLIC circuits;

high-energy components for each SLIC circuit being individual components which are arranged separately and externally from each individual SLIC;

the plurality of SLIC circuits being integrated in a multiple SLIC; and the individual components being fed back via a respectively allocated SLIC circuit of the plurality of SLIC circuits.

2. The subscriber circuit according to claim 1, wherein the individual components comprise an optical switch operatively connected to a transistor via a diode.

3. The subscriber circuit according to claim 2, wherein the transistor is one of a SIPMOS transistor and a power transistor.

4. The subscriber circuit according to claim 1, wherein the feeding back of the individual components ensues via an alternating current path and a direct current path.

5. The subscriber circuit according to claim 1, wherein, for a reversal of polarity, the individual components are arranged in a bridge circuit in a doubled and cross-coupled configuration.

6. A subscriber circuit having subscriber line interface circuits (SLIC), comprising:

a plurality of SLIC circuits;

respective high-energy components for each SLIC circuit of the plurality of SLIC circuits, wherein the high-energy components are arranged separately and externally from each individual SLIC;

the SLIC circuits being integrated in a multiple SLIC;

respective individual components being fed back via respectively allocated SLIC circuits of the plurality of SLIC circuits; and each of the respective individual components being at least an optical switch operatively connected to a transistor via a diode.

7. The subscriber circuit according to claim 6, wherein the transistor is one of a SIPMOS transistor and a power transistor.

8. The subscriber circuit according to claim 6, wherein the feeding back of the individual components ensues via an alternating current path and a direct current path.

9. The subscriber circuit according to claim 6, wherein, for a reversal of polarity, the individual components are arranged in a bridge circuit in a doubled and cross-coupled configuration.

10. A subscriber circuit having subscriber line interface circuits (SLIC), comprising:

a plurality of SLIC circuits;

each SLIC circuit of the plurality of SLIC circuits having associated therewith at least an optical switch connected to a transistor via a diode, wherein the optical switch the transistor, and the diode are arranged separately and externally from each SLIC circuit;

the SLIC circuits being integrated in the multiple SLIC;

respective transistors and optical switches being fed back via an alternating current path and a direct current path of the respectively allocated SLIC circuit.

11. The subscriber according to claim 10, wherein the transistor is one of a SIPMOS transistor and a power transistor.

12. The subscriber circuit according to claim 10, wherein, for a reversal of polarity, the transistors and optical switches are arranged in a bridge circuit in a doubled and cross-coupled configuration.

* * * * *